United States Patent
Baartman et al.

(10) Patent No.: US 7,685,604 B2
(45) Date of Patent: Mar. 23, 2010

(54) BUSINESS PROCESS EXECUTION LANGUAGE (BPEL) APPLICATION GENERATOR FOR LEGACY INTERFACES

(75) Inventors: Randall P. Baartman, Rochester, MN (US); Steven J. Branda, Rochester, MN (US); Christopher D. Johnson, Rochester, MN (US); Bhushan K. Lokhande, Rochester, MN (US); John J Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 11/427,553

(22) Filed: Jun. 29, 2006

(65) Prior Publication Data

US 2008/0022257 A1    Jan. 24, 2008

(51) Int. Cl.
G06F 3/00 (2006.01)
G06F 9/44 (2006.01)
G06F 13/00 (2006.01)

(52) U.S. Cl. ........................ 719/313; 717/106; 717/121; 717/168; 717/136

(58) Field of Classification Search .............. None
See application file for complete search history.

(56) References Cited

U.S. PATENT DOCUMENTS

| | | | |
|---|---|---|---|
| 2004/0220910 A1* | 11/2004 | Zang et al. | 707/3 |
| 2005/0251533 A1* | 11/2005 | Harken et al. | 707/104.1 |
| 2006/0036463 A1* | 2/2006 | Patrick et al. | 705/1 |
| 2006/0074736 A1* | 4/2006 | Shukla et al. | 705/8 |
| 2006/0212855 A1* | 9/2006 | Bournas et al. | 717/140 |
| 2007/0078667 A1* | 4/2007 | Chand et al. | 705/1 |
| 2007/0118386 A1* | 5/2007 | Mueller et al. | 705/1 |
| 2007/0143795 A1* | 6/2007 | Tran | 725/46 |

* cited by examiner

*Primary Examiner*—Hyung S Sough
*Assistant Examiner*—Tuan Dao
(74) *Attorney, Agent, or Firm*—Cantor Colburn LLP

(57) ABSTRACT

A method for capturing and converting legacy applications into a Business Process Execution Language (BPEL) model supporting a Service Oriented Architecture (SOA), the method comprising: starting a recorder for recording the legacy applications; mapping the plurality of variables of the legacy applications to a plurality of fields and to a plurality of sub-fields of the BPEL model; highlighting and identifying the plurality of fields and the plurality of sub-fields; identifying and generating partner links; identifying additional input variables of the legacy applications; mapping the additional input variables of the legacy applications to arbitrary variables; repeating the previous steps until an end result is generated; and ending the recorder.

9 Claims, 4 Drawing Sheets

BUSINESS PROCESS EXECUTION LANGUAGE (BPEL) APPLICATION GENERATOR FOR LEGACY INTERFACES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to legacy systems, and particularly to a method for capturing and converting a legacy application into a Business Process Execution Language (BPEL) model supporting Service Oriented Architecture (SOA) capabilities.

2. Description of Background

A legacy system is an existing computer system or application program, which continues to be used because the user (typically an organization) does not want to replace or redesign the computer system or application program. Legacy systems are considered to be potentially problematic by many software engineers for several reasons. Some of these reasons include the fact that legacy systems often run on obsolete hardware, and spare parts for such computer systems becomes increasingly difficult to obtain. In addition, these computer systems are often hard to maintain, improve, and expand because there is a general lack of understanding of the system. Also, the designers of such computer systems may have left the organization, so there is no one left to explain how it works. Inadequate documentation or manuals getting lost can exacerbate such a lack of understanding of how the system works. Integration with newer systems may also be difficult because new software may use completely different technologies.

As a result, maintaining and upgrading legacy systems is one of the most difficult challenges many organizations face today. Constant technological change often weakens the business value of legacy systems, which have been developed over the years through huge investments. Organizations constantly struggle with the problem of modernizing these systems while keeping their functionality intact. Rewriting a legacy system from scratch can create a functionally equivalent information system based on modern software techniques and hardware. However, the high risk of failure associated with any large software project lessens the chances of success.

Nevertheless, Service Oriented Architecture (SOA) systems may provide for a solution. SOA provides a process, including choreographer capabilities, process modeling, and application generation capabilities. Put simply, a SOA is any well-bounded, defined, and repeatable business task that can be invoked in a standard manner. The scope of this task can range from very narrow to quite broad. Thus, it may be a simple, one-step task, such as setting a customer's billing address, or a more complex task involving several steps and a number of possible outcomes.

In SOA systems, services can be nested. That is, one service can call another to perform a subtask. Within a service, the outcome of one task can influence whether another task is called or not. For example, depending on the outcome of a credit check, different credit limits may be imposed, or, in the worst case, the account may not be set up at all. This type of integration of services and the linking of outcomes is called service orientation. It is precisely this service orientation that allows applications built in this style to be both flexible and integrated.

Therefore, an SOA is simply an Information Technology (IT) architectural style that supports service orientation, based on open standards. It enables the modeling, design, assembly, deployment, and management of flexible, integrated applications from reusable services that are independent of the applications and computing platforms on which they run, supported by a governance approach and best practices derived from experience.

In the alternative, an SOA may be thought of as a collection of services. These services communicate with each other. The communication can involve either simple data passing or it could involve two or more services coordinating some activity. Some means of connecting services to each other is required. One goal of SOA is creating a worldwide mesh of collaborating services that are published and available for invocation on a Service Bus. Therefore, adopting SOA is essential to delivering the business agility and IT flexibility promised by Web Services.

However, SOA is captured in the form of business process resources. Business processes are described by using a Business Process Execution Language (BPEL) standard. In computing, BPEL is a business process language that is serialized in XML (Extensible markup language) and aims to enable programming in the large. The concepts of programming in the large and programming in the small distinguish between two aspects of writing the type of long-running asynchronous processes that one typically sees in business processes.

Programming in the large generally refers to the high-level state transition interactions of a process. BPEL refers to this concept as an Abstract Process. A BPEL Abstract Process represents a set of publicly observable behaviors in a standardized fashion. An Abstract Process includes information such as when to wait for messages, when to send messages, when to compensate for failed transactions, etc. Programming in the small, in contrast, deals with short-lived programmatic behavior, often executed as a single transaction and involving access to local logic and resources such as files, databases, etc. BPEL's development came out of the notion that programming in the large and programming in the small required different types of language. As a result, in addition to adopting a SOA, adopting a BPEL is also critical to delivering the business agility and IT flexibility promised by Web Services.

Consequently, in today's world, business agility is a requirement to subsist and IT systems are required to react rapidly. To change in a cost-efficient manner, integration must take place at the business process level in order to meet these goals. This level of integration is often referred to as Business Process Integration (BPI), and is the recommended integration approach when using SOA. Because business processes often span multiple internal and external systems, a BPI-based approach is required to address the coordination among many types of systems, and Web Services should be one of several options available to implement the integration among them.

BPEL has emerged as a standard to address BPI requirements. BPEL is a language that allows business analysts to consistently define business processes across companies. Because BPEL is based on XML standards, it ensures interoperability when integrating with other systems. BPEL promises to help coordinate integration efforts with customers, partners and vendors while making incremental changes to business processes easier to implement. However, despite the emergence of BPEL and SOA, many organizations are still reluctant to entirely abandon their legacy systems due to the expense in implementing different business methods.

Considering the limitations of legacy systems, it is clear that there is a need for an inexpensive method for converting existing legacy systems into a BPEL model supporting SOA capabilities.

SUMMARY OF THE INVENTION

The shortcomings of the prior art are overcome and additional advantages are provided through the provision of a method for capturing and converting legacy applications into a Business Process Execution Language (BPEL) model supporting a Service Oriented Architecture (SOA), the method comprising: identifying a business entry type, a name, and a plurality of variables of the legacy applications; defining a package and a plurality of file names used by the legacy applications; flagging a starting panel to enter into the BPEL model; starting a recorder for recording the legacy applications; entering data on a screen of a data processing device running the legacy applications; mapping the plurality of variables of the legacy applications to a plurality of fields and to a plurality of sub-fields of the BPEL model; highlighting the plurality of fields and the plurality of sub-fields; identifying the plurality of fields and the plurality of sub-fields; identifying one or more fields out of the plurality of fields to differentiate a request from a plurality of requests; identifying and generating partner links via a submit button located on the screen of the data processing device; identifying additional input variables of the legacy applications; mapping the additional input variables of the legacy applications to arbitrary variables; highlighting one or more of the plurality of fields that indicate one or more error conditions; generating a fault handler for each of the one or more error conditions; repeating the previous steps until an end result is generated; ending the recorder; choosing one or more variables to be returned as a result of processing the legacy applications; flagging the end result; saving the end result; generating an ear (Enterprise Archive) file that packages business process resource files; generating resource files describing a sequence of "invokes" that represent the legacy applications as a first set of SOA services having a plurality of variables; and generating a second set of SOA services associated with "assigns" for mapping the plurality of variables of the first set of SOA services to the second set of SOA services.

The shortcomings of the prior art are overcome and additional advantages are provided through the provision of a system for capturing and converting legacy applications into a Business Process Execution Language (BPEL) model supporting a Service Oriented Architecture (SOA), the system comprising: a network; and a host system in communication with the network, the host system including software to implement a method comprising: identifying a business entry type, a name, and a plurality of variables of the legacy applications; defining a package and a plurality of file names used by the legacy applications; flagging a starting panel to enter into the BPEL model; starting a recorder for recording the legacy applications; entering data on a screen of a data processing device running the legacy applications; mapping the plurality of variables of the legacy applications to a plurality of fields and to a plurality of sub-fields of the BPEL model; highlighting the plurality of fields and the plurality of sub-fields; identifying the plurality of fields and the plurality of sub-fields; identifying one or more fields out of the plurality of fields to differentiate a request from a plurality of requests; identifying and generating partner links via a submit button located on the screen of the data processing device; identifying additional input variables of the legacy applications; mapping the additional input variables of the legacy applications to arbitrary variables; highlighting one or more of the plurality of fields that indicate one or more error conditions; generating a fault handler for each of the one or more error conditions; repeating the previous steps until an end result is generated; ending the recorder; choosing one or more variables to be returned as a result of processing the legacy applications; flagging the end result; saving the end result; generating an ear (Enterprise Archive) file that packages business process resource files; generating resource files describing a sequence of "invokes" that represent the legacy applications as a first set of SOA services having a plurality of variables; and generating a second set of SOA services associated with "assigns" for mapping the plurality of variables of the first set of SOA services to the second set of SOA services.

The shortcomings of the prior art are overcome and additional advantages are provided through the provision of a computer program product for capturing and converting legacy applications into a Business Process Execution Language (BPEL) model supporting a Service Oriented Architecture (SOA), the computer program product comprising: a storage medium readable by a processing circuit and storing instructions for execution by the processing circuit for performing a method comprising: identifying a business entry type, a name, and a plurality of variables of the legacy applications; defining a package and a plurality of file names used by the legacy applications; flagging a starting panel to enter into the BPEL model; starting a recorder for recording the legacy applications; entering data on a screen of a data processing device running the legacy applications; mapping the plurality of variables of the legacy applications to a plurality of fields and to a plurality of sub-fields of the BPEL model; highlighting the plurality of fields and the plurality of sub-fields; identifying the plurality of fields and the plurality of sub-fields; identifying one or more fields out of the plurality of fields to differentiate a request from a plurality of requests; identifying and generating partner links via a submit button located on the screen of the data processing device; identifying additional input variables of the legacy applications; mapping the additional input variables of the legacy applications to arbitrary variables; highlighting one or more of the plurality of fields that indicate one or more error conditions; generating a fault handler for each of the one or more error conditions; repeating the previous steps until an end result is generated; ending the recorder; choosing one or more variables to be returned as a result of processing the legacy applications; flagging the end result; saving the end result; generating an ear (Enterprise Archive) file that packages business process resource files; generating resource files describing a sequence of "invokes" that represent the legacy applications as a first set of SOA services having a plurality of variables; and generating a second set of SOA services associated with "assigns" for mapping the plurality of variables of the first set of SOA services to the second set of SOA services.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method for capturing and converting existing legacy systems into a BPEL model supporting SOA capabilities.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
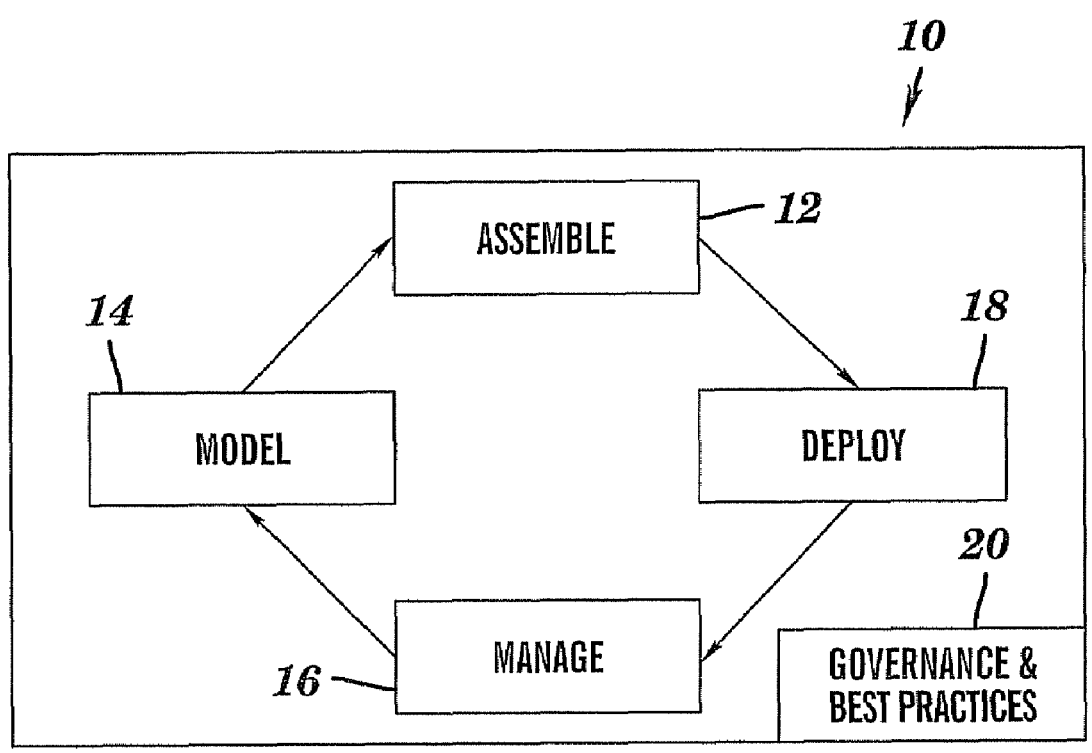
FIG. 1 illustrates one example of software products supporting a Service Oriented Architecture (SOA) life cycle model.

One aspect of the exemplary embodiments is a method for capturing and converting a legacy application into a Business Process Execution Language (BPEL) supporting Service Oriented Architecture (SOA) capabilities.

Many legacy applications only have terminal interfaces. Typical business operations involve navigating through a series of predictable screens for a series of transactions. There are already many bridging and gateway solutions that allow interacting with these screens. These technologies make it easier for customers to use web browsers with the legacy applications but do not allow bridging modern technologies. Moreover, many legacy "green-screen" applications are process-oriented. The term "legacy application" is used to refer to existing host-based applications, including what are known as "green-screen" applications. These applications continue to be a significant part of the mix of business applications within a company. However, business applications cannot remain static, and should be changed to meet business requirements and to adapt to technology advancements.

The exemplary embodiments of the present invention describe a system and a method where an existing, legacy or green-screen application is converted to a new SOA business process model. Each green-screen interaction is redefined as a service, and the legacy application in total is redefined as a set of logically connected services.

"Green-screen" interactions may be recorded and categorized into a single business process, and subsequently generated into an SOA business process model. The generated SOA business process model then can interact with bridge or gateway products to interact with the original screen interfaces, thus extending the legacy application into the world of SOA business process model compliant application-server middleware.

SOA provides capabilities to transform the definition of business processes into a new model that involves using application server middleware products to choreograph the business processes. The business process is captured in the form of a business process resource (BPEL files and corresponding WSDL (Web Service Description Language) files). The BPEL standard defines a way to describe business processes.

A BPEL file is an XML (Extensible Markup Language) file that defines a business process by separating the model from the implementation and the runtime execution. For BPEL applications, WSDL files are also used to define associated data for BPEL, even if no actual web services are in use.

BPEL is based on WSDL and any data that flows through a BPEL process is represented in XML. This means that any incoming and outgoing messages, as well as variables defined internally are defined using the XSD (XML Schema Definition) language. The entry and exit points of a BPEL process are known as partner links. A partner link is typically bound to a port type defined in a WSDL file. As in Web Services, the port type defines the structure of the input and output XML messages of the business process. The core unit of work in a BPEL process is known as an activity. There are two types of activities: basic and structured. Examples of basic activities include: "receive," used to activate or reactivate a business process; "invoke," typically used to communicate to another entity defined as a partner link; "assign" to set values of internal variables; and "wait" to block execution for a period of time. Structured activities are used to control logical flow of the process and include among others: "switch" to support conditional statements; "while" to allow iterative activity; and "flow" to allow to fork and join parallel activities.

Many organizations use modeling tools, such as Eclipse-based tools like the WebSphere Application Developer—Integration Edition (WSADIE), or WebSphere Integration Edition (WID) to graphically model business processes. WSADIE and WID are examples of rapid application deploy tools and modelers, and one skilled in the art may use a number of different rapid application tools to graphically model business processes. Once modeled, the business process can be saved in the form of various artifacts including one or more BPEL files and corresponding WSDL files. If defined completely, the service project can be used to generate an ear file (Enterprise Archive file) that can be deployed on an application server. The ear file is a J2EE-format file containing project resources and executable code for an application capable of running on an application server. An example of such an application can be a Host Access Transformation Services (HATS) application. J2EE is a Java 2 Platform, Enterprise Edition, which is an environment for developing and deploying enterprise applications. The J2EE platform consists of a set of services, Application Programming Interfaces (APIs), and protocols that provide the functionality for developing multitiered, Web-based applications. HATS is an IBM software product that enables a user to present host applications as Web-based applications.

The exemplary embodiments of the present invention provide for a system and method to capture and convert a green-screen legacy application into a BPEL model supporting SOA capabilities. In addition, the exemplary embodiments of the present invention bridge technology to go from green-screen legacy application to an SOA/BPEL modeler via generating business process resources.

Referring to FIG. 1, one example of software products supporting a Service Oriented Architecture (SOA) life cycle model is illustrated. As shown in FIG. 1, SOA identifies a closed-loop development approach comprising four steps: model, assemble, deploy, and manage. Specifically, SOA model 10 includes an assemble block 12, a model block 14, a manage block 16, and a deploy block 18. The SOA model 10 is incorporated within a governance and best practices environment 20. The assemble block 12 creates and assembles collaborative and composite applications. The model block 14 models and simulates business processes and underlying IT (Information Technology) assets. The manage block 16 achieves real-time visibility into process performance, while ensuring availability and security meet service levels. The deploy block 18 delivers secure, modular, extensible role-based workplace environments. The governance and best practices environment 20 supports corporate governance and conversions strategies into concrete objects.

Flexible and integrated applications, built according to the architecture shown in FIG. 1, are known as composite applications and form the foundation for business processes that are well-enough integrated and sufficiently flexible to meet the requirements of an "on-demand" business process. In the past, a business process was seen as a largely static set of tasks residing mainly within one organizational unit, and the drive was to implement it as far as possible within a single, monolithic, traditional application. Going forward, a business process is treated as a flexible workflow, composed of independent services spanning organizational boundaries and easily changed as mandated by a business requirement.

Figure 2:
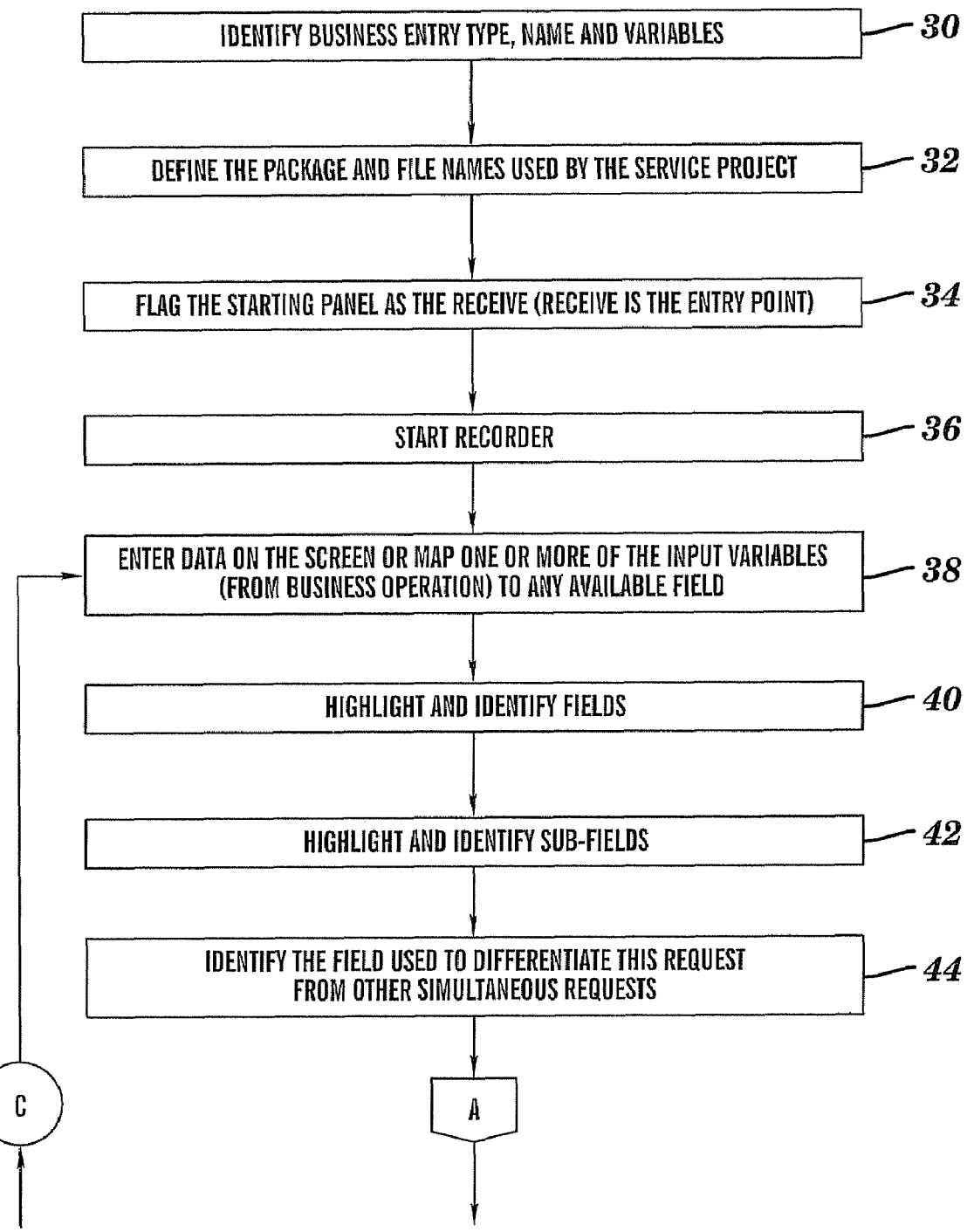
FIGS. 2-4 illustrate one example of a flowchart illustrating a mapping process for mapping a legacy system into Business Process Execution Language (BPEL) elements that support SOA capabilities, according to the exemplary embodiments of the present invention.
Figure 3:
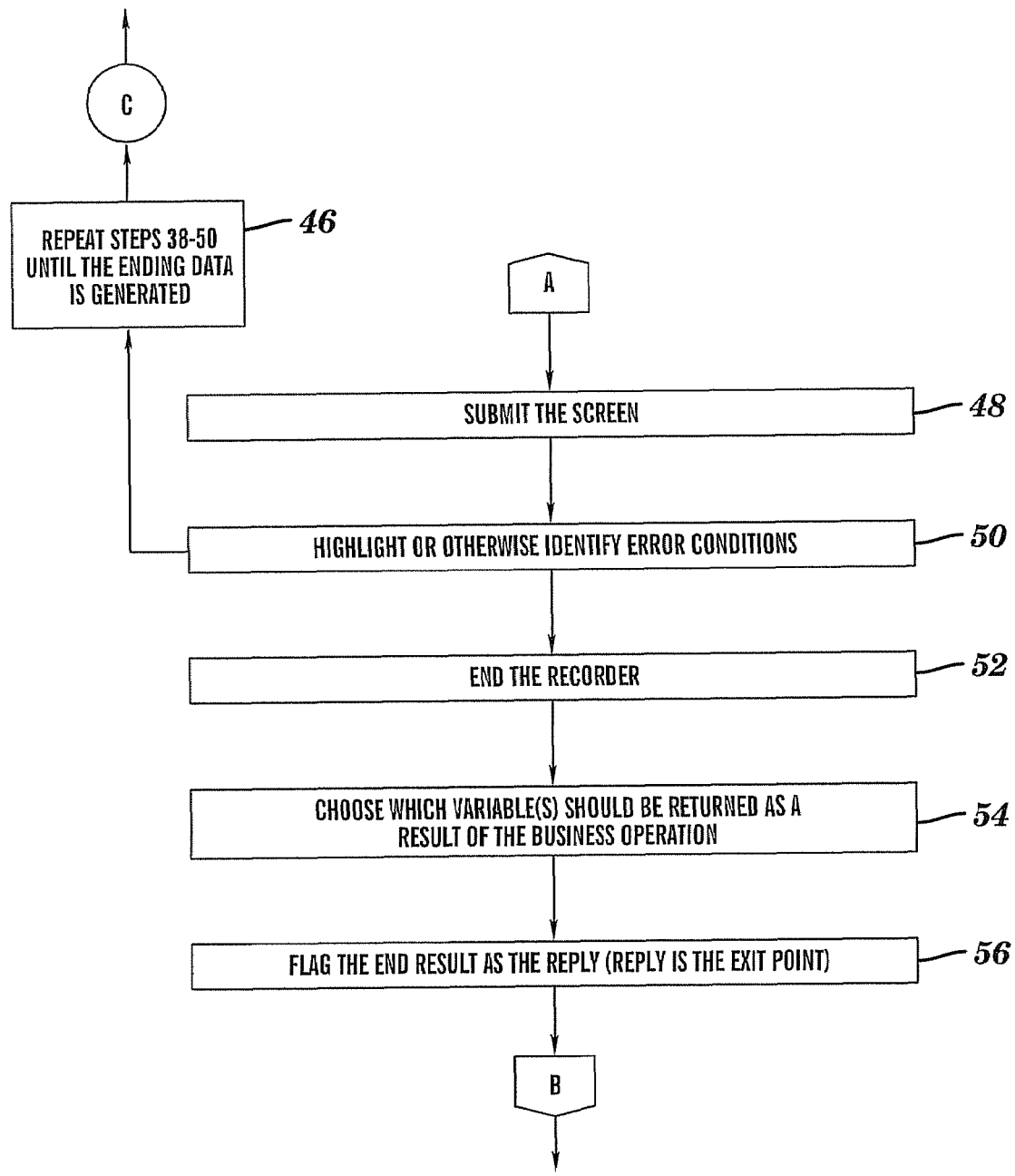
Figure 4:
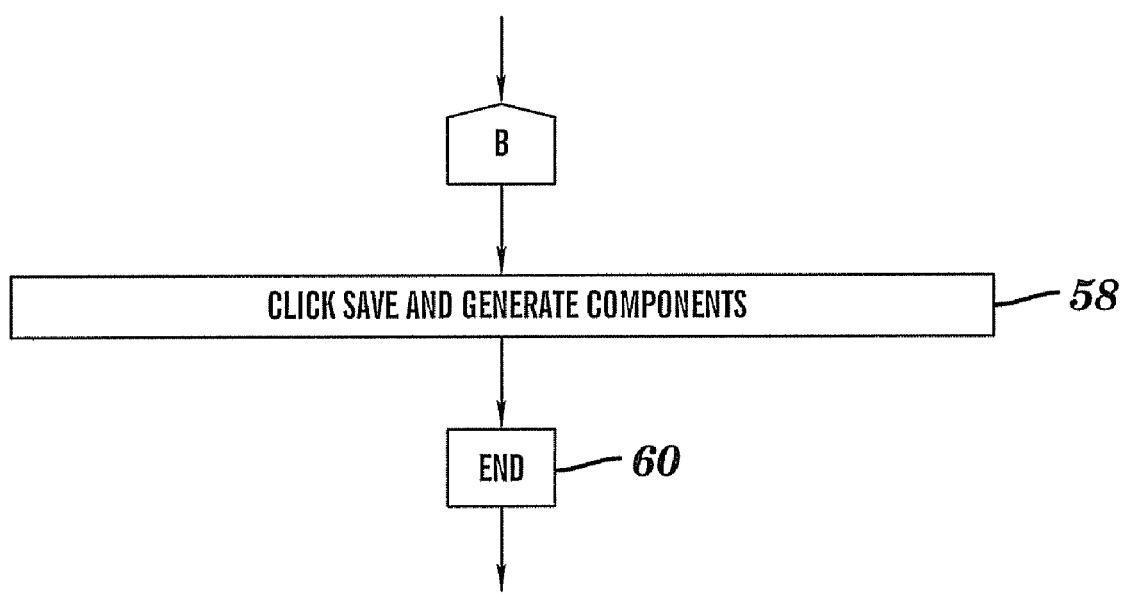

Referring to FIGS. 2-4, one example of a flowchart illustrating a mapping process for mapping a legacy system into Business Process Execution Language (BPEL) elements that support SOA capabilities, according to the exemplary embodiments of the present invention.

Referring to FIG. 2, the capturing and converting process starts at step 30. In step 30, a business entry type (EJB, Web Service, etc.), a name and parameters are identified. In step 32, the package and file names used by the service project are defined. In step 34, the starting panel is flagged as the "Receive," the entry point for the BPEL model. In step 36, the recorder starts its operation. In step 38, data is entered on a screen of a data processing device or the data is mapped from one or more of the input variables (from business operation) to any available field. In step 40, the fields are highlighted and identified. In step 42, the sub-fields are highlighted and identified. The fields are used to generate variables in the BPEL file, and the subfields become message parts defined in the WSDL file(s). For example, an address field is defined in the BPEL file, and subfields such as apartment number, street, city, state, and zip become messages parts defined in a WSDL file. In step 44, if this is the first panel in the legacy application (in a succession of panels that defines a business process), flag the field that differentiates this request from other simultaneous requests (for example, customer ID, order number, etc). This differentiation field becomes the correlation identifier used in the BPEL model to differentiate simultaneous requests and thus enable parallel business processes.

Referring to FIG. 3, the capturing and converting process is continued from FIG. 2. In step 48, the legacy application screen is submitted. The submit button is used to identify and generate partner links. The partner links, ports, and port types are generated into correct WSDL syntax. It will be noted that additional prompting is used to fully define partner links, partner link types, port types, and roles necessary to fully define the linked interactions. In step 50, all fields that indicate problems are highlighted, to generate fault handlers. Another BPI requirement addressed in BPEL is error handling across processes. In any business system, system and non-system errors are likely to occur. For this reason, a BPEL process should be able to propagate and communicate failures between processes and provide the ability to specify a compensation flow through a compensation handler. A compensation flow may include all actions required to reverse activities that had already been committed. Additional prompting may be necessary to fully define error conditions, fault handling, and compensation actions and activities. Steps 38-50 are repeated until the sequence of green screens in the business process is complete. In step 52, when the sequence of green screens in the business process is complete, the recorder can end. In step 54 a choice is made concerning which variable(s) should be returned as a result of the business operation. In step 56, the 'end result' is flagged as the "Reply," which is the exit point in a BPEL process.

Referring to FIG. 4, the capturing and converting process continues after the recorder ended its processes. In step 58, the save button is clicked and once the save button has been clicked the application generates several components. Specifically, an ear file is generated. This ear file packages the business process resource files (BPEL and WSDL file with all supporting files). This ear file can be imported as a service project into a development environment such as WSADIE or WID. In addition, the ear contains BPEL XML files that describe a sequence of "invokes" that represent the green-screen panels as services (activities). Moreover, the BPEL XML files also include 'assigns' that map variables from one service activity to the next activity. In step 60, the mapping process terminates.

Therefore, as illustrated in FIGS. 2-4, once parts of the green-screen application are identified, business process resource files can be generated to aid in the capturing and converting processes.

An organization can import the resources into a development environment like WebSphere Application Developer Integration Edition (WSADIE) or WebSphere Integration Developer (WID). Once there, the organization can obtain the modeler diagram that shows (1) each of the green-screens that were just recorded and are modeled as BPEL activities, and (2) all of the variables that are received when the highlighter used to mark input and output fields on the green-screens are now modeled as data maps that describe the inputs and outputs to an organizations activities.

In addition, when green-screen applications or legacy systems are converted to and modeled as BPEL using WSADIE or WID, then this opens up possibilities for many applications. WSADIE and WID are examples of a rapid application deploy tool and modeler, and one skilled in the art may use a number of different rapid application tools to achieve similar results. Some of the new possibilities opened up include: (1) converting legacy application logic to web service(s), (2) extending the legacy application logic to use other web services, (3) replacing partner links to other green-screens with partner links to business-to-business web services for outsourcing parts of the legacy application rather than continuing to maintain obsolete legacy logic in-house, (4) converting the legacy application from being a single transaction to one with multiple transactions, (5) extending the legacy application to use BPEL extensions such as staff services, compensation, and other innovations, (6) extending the legacy application to use new logic patterns or BPEL extensions to logic patterns, (7) extending the legacy application to use new activities or structured activities, (8) changing parts of the legacy application flow from synchronous to asynchronous operations, (9) replacing specific "green-screen" steps with new interfaces, runtime modules, or interfaces, (10) adding auditing capability to the legacy application, and (11) maintaining compatibility with and utilizing existing legacy application green-screen interfaces.

As a result, the exemplary embodiments of the present invention improve upon common legacy systems by providing recording of the green-screens with their input/output fields, but instead of generating a regular business process applications, the exemplary embodiments generate artifacts (BPEL and WSDL files) necessary for import into a development environment like WSADIE or WID, where the application can be modified or extended, or simply viewed and left "as-is," and optionally generate the application as an ear file that can be imported into a middleware application server that has process choreography capabilities, while maintaining compatibility with legacy green-screen parts of the process application via interaction with bridge or gateway products.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for capturing and converting legacy applications into a Business Process Execution Language (BPEL) model supporting a Service Oriented Architecture (SOA), the method comprising:
   identifying a business entry type, a name, and a plurality of variables of the legacy applications;
   defining a package and a plurality of file names used by the legacy applications;
   flagging a starting panel to enter into the BPEL model;
   starting a recorder for recording the legacy applications;
   entering data on a screen of a data processing device running the legacy applications;
   mapping the plurality of variables of the legacy applications to a plurality of fields and to a plurality of sub-fields of the BPEL model;
   identifying and highlighting the plurality of fields and the plurality of sub-fields;
   identifying one or more fields out of the plurality of fields to differentiate a request from a plurality of requests;
   identifying and generating partner links via a submit button located on the screen of the data processing device;
   identifying additional input variables of the legacy applications;
   mapping the additional input variables of the legacy applications to arbitrary variables;
   highlighting one or more of the plurality of fields that indicate one or more error conditions;
   generating a fault handler for each of the one or more error conditions;
   repeating the previous steps until an end result is generated;
   ending the recorder;
   choosing one or more variables to be returned as a result of processing the legacy applications;
   flagging the end result;
   saving the end result;
   generating an ear (Enterprise Archive) file that packages business process resource files;
   generating resource files describing a sequence of invokes that represent the legacy applications as a first set of SOA services having a plurality of variables; and
   generating a second set of SOA services associated with assigns for mapping the plurality of variables of the first set of SOA services to the second set of SOA services.

2. The method of claim 1, wherein the plurality of fields are used to generate variables in a BPEL file, and the plurality of sub-fields are message parts defined in one or more WSDL (Web Service Description Language) files.

3. The method of claim 2, wherein an address field is defined in the BPEL file.

4. The method of claim 1, wherein the partner links are generated into an appropriate BPEL file and an appropriate WSDL file.

5. A system for capturing and converting legacy applications into a BPEL model supporting a SOA, the system comprising:
   a network; and
   a host system in communication with the network, the host system including software to implement a method comprising:
      identifying a business entry type, a name, and a plurality of variables of the legacy applications;
      defining a package and a plurality of file names used by the legacy applications;
      flagging a starting panel to enter into the BPEL model;
      starting a recorder for recording the legacy applications;
      entering data on a screen of a data processing device running the legacy applications;
      mapping the plurality of variables of the legacy applications to a plurality of fields and to a plurality of sub-fields of the BPEL model;
      identifying and highlighting the plurality of fields and the plurality of sub-fields;
      identifying one or more fields out of the plurality of fields to differentiate a request from a plurality of requests;
      identifying and generating partner links via a submit button located on the screen of the data processing device;
      identifying additional input variables of the legacy applications;
      mapping the additional input variables of the legacy applications to arbitrary variables;
      highlighting one or more of the plurality of fields that indicate one or more error conditions;
      generating a fault handler for each of the one or more error conditions;
      repeating the previous steps until an end result is generated;
      ending the recorder;
      choosing one or more variables to be returned as a result of processing the legacy applications;
      flagging the end result;
      saving the end result;
      generating an ear (Enterprise Archive) file that packages business process resource files;
      generating resource files describing a sequence of invokes that represent the legacy applications as a first set of SOA services having a plurality of variables; and generating a second set of SOA services associated with assigns for mapping the plurality of variables of the first set of SOA services to the second set of SOA services.

6. The system of claim 5, wherein the plurality of fields are used to generate variables in a BPEL file, and the plurality of sub-fields are message parts defined in one or more WSDL (Web Service Description Language) files.

7. The system of claim 6, wherein an address field is defined in the BPEL file.

8. The system of claim 5, wherein the partner links are generated into an appropriate BPEL file and an appropriate WSDL file.

9. A computer program product for capturing and converting legacy applications into a BPEL model supporting a SOA, the computer program product comprising:
- a storage medium readable by a processing circuit and storing instructions for execution by the processing circuit for performing a method comprising:
  - identifying a business entry type, a name, and a plurality of variables of the legacy applications;
  - defining a package and a plurality of file names used by the legacy applications;
  - flagging a starting panel to enter into the BPEL model;
  - starting a recorder for recording the legacy applications;
  - entering data on a screen of a data processing device running the legacy applications;
  - mapping the plurality of variables of the legacy applications to a plurality of fields and to a plurality of sub-fields of the BPEL model;
  - highlighting the plurality of fields and the plurality of sub-fields;
  - identifying the plurality of fields and the plurality of sub-fields;
  - identifying one or more fields out of the plurality of fields to differentiate a request from a plurality of requests;
  - identifying and generating partner links via a submit button located on the screen of the data processing device;
  - identifying additional input variables of the legacy applications;
  - mapping the additional input variables of the legacy applications to arbitrary variables;
  - highlighting one or more of the plurality of fields that indicate one or more error conditions;
  - generating a fault handler for each of the one or more error conditions;
  - repeating the previous steps until an end result is generated;
  - ending the recorder;
  - choosing one or more variables to be returned as a result of processing the legacy applications;
  - flagging the end result;
  - saving the end result;
  - generating an ear (Enterprise Archive) file that packages business process resource files;
  - generating resource files describing a sequence of invokes that represent the legacy applications as a first set of SOA services having a plurality of variables; and
  - generating a second set of SOA services associated with assigns for mapping the plurality of variables of the first set of SOA services to the second set of SOA services.

* * * * *